US010081771B2

(12) United States Patent
Heimann

(10) Patent No.: US 10,081,771 B2
(45) Date of Patent: Sep. 25, 2018

(54) RAPID COMPRESSION APPARATUS FOR TREATMENT OF MOISTURE-CONTAINING BIO-MATERIAL

(71) Applicant: Enginuity Worldwide, LLC, Mexico, MO (US)

(72) Inventor: Robert L. Heimann, Centralia, MO (US)

(73) Assignee: ENGINUITY WORLDWIDE, LLC., Mexico, MO (US)

( * ) Notice: Subject to any disclaimer, the term of this patent is extended or adjusted under 35 U.S.C. 154(b) by 204 days.

(21) Appl. No.: 15/140,409

(22) Filed: Apr. 27, 2016

(65) Prior Publication Data

US 2016/0312123 A1   Oct. 27, 2016

Related U.S. Application Data

(60) Provisional application No. 62/153,130, filed on Apr. 27, 2015.

(51) Int. Cl.
*C10J 3/00* (2006.01)
*C10B 47/12* (2006.01)
(Continued)

(52) U.S. Cl.
CPC ............ *C10J 3/007* (2013.01); *C10B 27/06* (2013.01); *C10B 47/12* (2013.01); *C10B 53/02* (2013.01);
(Continued)

(58) Field of Classification Search
CPC ....... C10J 3/007; C10J 3/30; C10J 3/62; C10J 3/723; C10J 2300/0916; C10J 2200/0909;
(Continued)

(56) References Cited

U.S. PATENT DOCUMENTS 2,991,947 A * 7/1961 Schuyler ............... B02C 17/007
241/171
3,812,985 A * 5/1974 Lindeborg ................ B65F 3/22
100/145
(Continued)

FOREIGN PATENT DOCUMENTS

| WO | 2009102131 | 8/2009 |
|----|------------|--------|
| WO | 2011100695 | 8/2011 |
| WO | 2014027809 | 2/2014 |

OTHER PUBLICATIONS

ISRWO of PCT/US2016/029620 dated Jul. 5, 2016.
(Continued)

*Primary Examiner* — Renee Robinson
*Assistant Examiner* — Gabriel E Gitman
(74) *Attorney, Agent, or Firm* — Burris Law, PLLC

(57) ABSTRACT

An apparatus, a system, and a method for heat treating a moisture-containing or water-laden material are provided. The heat treatment can be drying for dehydration, gasification, or full carbonization. The system comprises a feeding mechanism, and a rapid compression unit (RCU) apparatus having a screw, a barrel, and one or more flow disrupters. The system can further include a reflux condenser, an aftercooler stage, a second condenser for particle filtering, and an exit mechanism. The one or more flow disrupters are located on an inner surface of the barrel and project into the passageway created by the screw and the barrel. The screw is sized to fit within the barrel such that flow disrupter does not contact the screw. The one or more flow disrupters cause the water-laden material to fold over onto its self, thereby, allowing for the occurrence of more uniform drying.

20 Claims, 6 Drawing Sheets

(51) Int. Cl.

| | |
|---|---|
| *F26B 11/12* | (2006.01) |
| *F26B 23/00* | (2006.01) |
| *F26B 25/00* | (2006.01) |
| *F26B 25/04* | (2006.01) |
| *C10B 27/06* | (2006.01) |
| *C10B 53/02* | (2006.01) |
| *C10J 3/30* | (2006.01) |
| *C10J 3/62* | (2006.01) |
| *C10J 3/72* | (2006.01) |

(52) U.S. Cl.
CPC .  *C10J 3/30* (2013.01); *C10J 3/62* (2013.01); *C10J 3/723* (2013.01); *F26B 11/12* (2013.01); *F26B 23/00* (2013.01); *F26B 25/003* (2013.01); *F26B 25/04* (2013.01); *C10J 2200/158* (2013.01); *C10J 2300/0909* (2013.01); *C10J 2300/0916* (2013.01); *F23G 2203/8013* (2013.01); *F26B 2200/02* (2013.01); *F26B 2200/06* (2013.01); *F26B 2200/10* (2013.01); *F26B 2200/24* (2013.01); *Y02E 50/14* (2013.01)

(58) Field of Classification Search
CPC .... C10J 2200/158; C10B 53/02; C10B 47/12; C10B 27/06; F26B 11/12; F26B 23/00; F26B 25/003; F26B 25/04; F26B 2200/02; F26B 2200/10; F26B 2200/06; F26B 2200/24; Y02E 50/14
See application file for complete search history.

(56) References Cited

U.S. PATENT DOCUMENTS

| | | | |
|---|---|---|---|
| 8,476,480 | B1 | 7/2013 | Brown et al. |
| 8,667,706 | B2 | 3/2014 | Smith et al. |
| 9,140,945 | B2 | 9/2015 | Kitajima et al. |
| 2008/0149471 | A1* | 6/2008 | Wolfe .................. C10B 47/44 201/8 |
| 2011/0214343 | A1* | 9/2011 | Wechsler .............. C10B 47/44 44/605 |
| 2012/0217442 | A1 | 8/2012 | Jeney |
| 2015/0184098 | A1 | 7/2015 | Talwar |

OTHER PUBLICATIONS

Bridgwater, A.V.; Peacocke, G.V.C. 2000. Fast pyrolysis processes for biomass. Renewable and Sustainable Energy Reviews. vol. 4: pp. 1-73.
Demirbas, Ayhan. 2007. The influence of temperature on the yields of compounds existing in bio-oils obtained from biomass samples via pyrolysis. Fuel Processing Technology. vol. 88(6): pp. 591-597.
Yasuhara, Akio; Sugiura, Ginji. 1987. Volatile Compounds in Pyroligneous Liquids from Karamatsu and Chishima-sasa. Agricultural and Biological Chemistry. vol. 51(11): pp. 3049-3060.
Azargohar, R.; Dalai, A.K. 2006. Biochar as a precursor of activated carbon. Appl. Biochem. Biotechnol. vol. 129-132: 762-773.
Dalai, Ajay K; Azargohar, R. 2007. Production of Activated Carbon from Biochar Using Chemical and Physical Activation: Mechanism and Modeling. Materials, Chemicals, and Energy from Forest Biomass. Chapter 29: pp. 463-476.
Azargohar, R.; Dalai, A.K. 2008. Steam and KOH activation of biochar: Experimental and modeling studies. Microporous and Mesoporous Materials. vol. 110 (2-3): pp. 413-421.
Sadaka, Samy; Boateng, A.A. Pyrolysis and Bio-Oil. Agriculture and Natural Resources. University of Arkansas Division of Agriculture FSA #1052. Accessed on May 2016 at < http://www.uaex.edu/publications/pdf/fsa-1052.pdf>.
Hagner, Marleena. 2013. Potential of the slow pyrolysis products birch tar oil, wood vinegar and biochar in sustainable plant protection-pesticide effects, soil improvement and environmental risks. Academic Dissertation in Environmental Ecology. Presented Sep. 20, 2013 at the University of Helsinki.
Czernik, S.; Bridgwater, A.V. 2004. Overview of Applications of Biomass Fast Pyrolysis Oil. Energy and Fuels. vol. 18: pp. 590-598.
Diebold, J.P. 1997. Overview of Fast Pyrolysis of Biomass for the Production of Liquid Fuels. Developments in Thermochemical Biomass Conversion. Chapter: pp. 5-26.
Xiu, Shuangning; Shahbazi, Abolghasem. 2012. Bio-oil Production and Upgrading Research: A Review. Renewable and Sustainable Energy Reviews. vol. 16: pp. 4406-4414.
Bridgwater, A.V.; Peacocke, G.V.C. Engineering Developments in Fast Pyrolysis for Bio-oils. Biomass Pyrolysis Oil Properties and Combustion Meeting in Golden, CO. Accessed on Jun. 21, 2016 at < http://digital.library.unt.edu/ark:/67531/metadc665006/m1/121/>.
Bridgwater, A.V. 1999. Principles and practice of biomass fast pyrolysis processes for liquids. Journal of Analytical and Applied Pyrolysis. vol. 51: pp. 3-22.

* cited by examiner

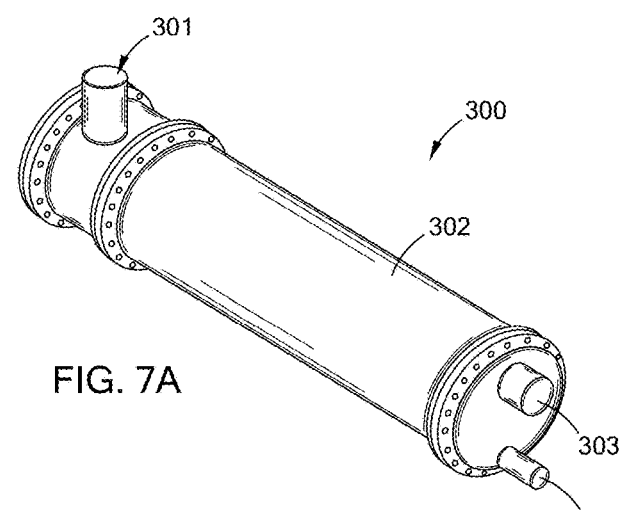
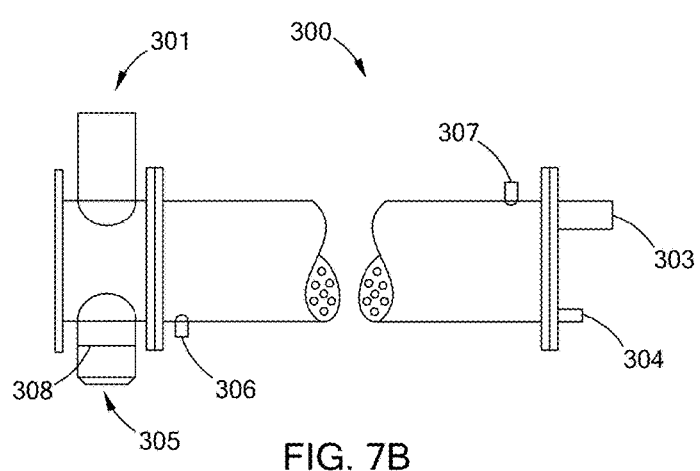
FIG. 7A
FIG. 7B

RAPID COMPRESSION APPARATUS FOR TREATMENT OF MOISTURE-CONTAINING BIO-MATERIAL

CROSS-REFERENCE TO RELATED APPLICATIONS

This application claims the benefit of U.S. Provisional Patent Application Ser. No. 62/153,130, titled "Gasification and Drying Apparatus," filed Apr. 27, 2015, the contents of which are incorporated herein by reference in their entirety.

FIELD

The present disclosure relates generally to an apparatus and method used to heat treatment such as gasification and drying of materials. More specifically, this disclosure relates to system, equipment, and methods that improve the performance and efficiency of production processes used to heat treat cellulosic materials, biomass materials, coal, or other materials for the production of bio-products.

BACKGROUND

The statements in this section merely provide background information related to the present disclosure and may not constitute prior art.

A conventional wood gasification apparatus uses only the friction created by a fixed screw and barrel. The screw design is typically one of a continuous decreasing design which increases the pressure on the cellulosic material and maximizes the frictional heating until the material reaches a temperature above its auto ignition temperature. Once the vaporization temperature is reached, the cellulosic material is converted into a combination of combustible fuel gases that typically contains a mixture of methane, hydrogen and carbon monoxide. Any particulate material that is present is frictionally heated and propelled along the auger until it reaches a plasticizing or softening temperature and forms an in-situ seal between the auger and the housing. This in-situ seal prevents gas from flowing back along the auger to the housing inlet.

However, in practice, a conventional wood gasification apparatus is also prone to plugging as the particulate material is carburized. This plugging can be catastrophic, shutting down the process by overloading the electrical current and/or shearing coupling drives and/or bolts. Additionally, the plasticizing seal is minimal to non-existent when processing non-woody biomass due to lower lignin content. Once a plug forms, the unit must be allowed to off-gas, cool to below the auto ignition temperature and then be disassembled for cleaning. The carbonized mass must be scraped from the threads and inside of the housing, a process that takes hours, which results in substantial lost production time.

A rotary biomass dryer provides a low cost alternative to conventional biomass drying. The rotary biomass dryer requires no external energy, only a motor to rotate the compression auger effectively heating the biomass by compression and friction to generate in-situ steam.

The rotary biomass dryer, which often has an adjustable nozzle, is also equipped with a compression screw. Similar to the wood gasification apparatus, the rotary biomass dryer is prone to plugging, which results in hours, if not days, to clean and restart the process. On rotary biomass dryers powered by 100-250 horsepower, the plugging may occur without notice and require a large hydraulic jack to extract the screw. In addition, the biomass dryer is deployed with an adjustable nozzle that is cumbersome and prone to high wear. During processing, only the biomass in direct contact with the compression screw or elongated tube is dried during the process.

SUMMARY

The present disclosure generally provides an apparatus, a system, and a method for heat treating a moisture-containing or water-laden material to produce a bio-product. The system includes a rapid compression unit (RCU) apparatus having a compression screw, a barrel, and one or more flow disrupters. The flow disrupters are mounted on an interior surface of the barrel positioned in a passageway formed between the screw and the interior surface of the barrel, and in one form, such that the screw and the one or more flow disrupters do not touch. The screw is operable for rotating at a speed to produce friction and compression to generate a desired raised temperature within the barrel.

The system further includes a feeding mechanism for feeding a moisture-containing material to the RCU apparatus. The RCU apparatus is adapted to receive, heat, and mix the moisture-containing material along a longitudinal axis defined by the barrel and the screw and output a heat treated bio-product and exhaust gas. The system can further include a reflux condenser for receiving the bio-product from the RCU apparatus and a second condenser for receiving and condensing any volatile gasses resulting from the treatment in the RCU apparatus. The resultant condensate from reflux condenser is either combined with the condensate from the second condenser or directly fed to an aftercooler for additional cooling to form a treated bio-product which is then fed to an exit mechanism. In an example, the second condenser is a shell and tube condenser and is adapted to (i) receive syngas from the RCU apparatus, and (ii) condense the syngas to produce bio-oil.

In yet another example, the one or more flow disrupters are operable to cause the moisture or water-laden material to fold over onto itself, thereby, allowing for more uniform heat treatment. The one or more flow disrupters each represent a metal component that is individually selected to define a geometric shape selected from the group consisting of a square, rectangular, triangular, trapezoidal shape, and combinations thereof. In still another example, the one or more flow disrupters define a plurality of flow disrupters and the flow disrupters are spaced apart either radially about the inner diameter of the barrel or continuously spaced throughout the barrel.

The system can further include a control system for adjusting the barrel relative to the screw using precision controls and simple hydraulic currents. A nozzle can be provided that is connected to the RCU apparatus in conjunction with one or more adjustable air/oxygen inlet ports to perform any one of direct heating, drying, steam production and combinations thereof. The nozzle can further include at least one or more of a supplemental gas inlet ports, an ignitor, and combination thereof coupled to the nozzle.

According to another aspect of the present disclosure, a material is dried according to the method and/or using the apparatus or system described above and further disclosed herein. The material being dried may be, without limitation, a cellulosic material, a biomass material, or coal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which:

FIGS. 7A and 7B illustrate a shell and tube condenser according to the teachings of the present disclosure.

Figure 1:
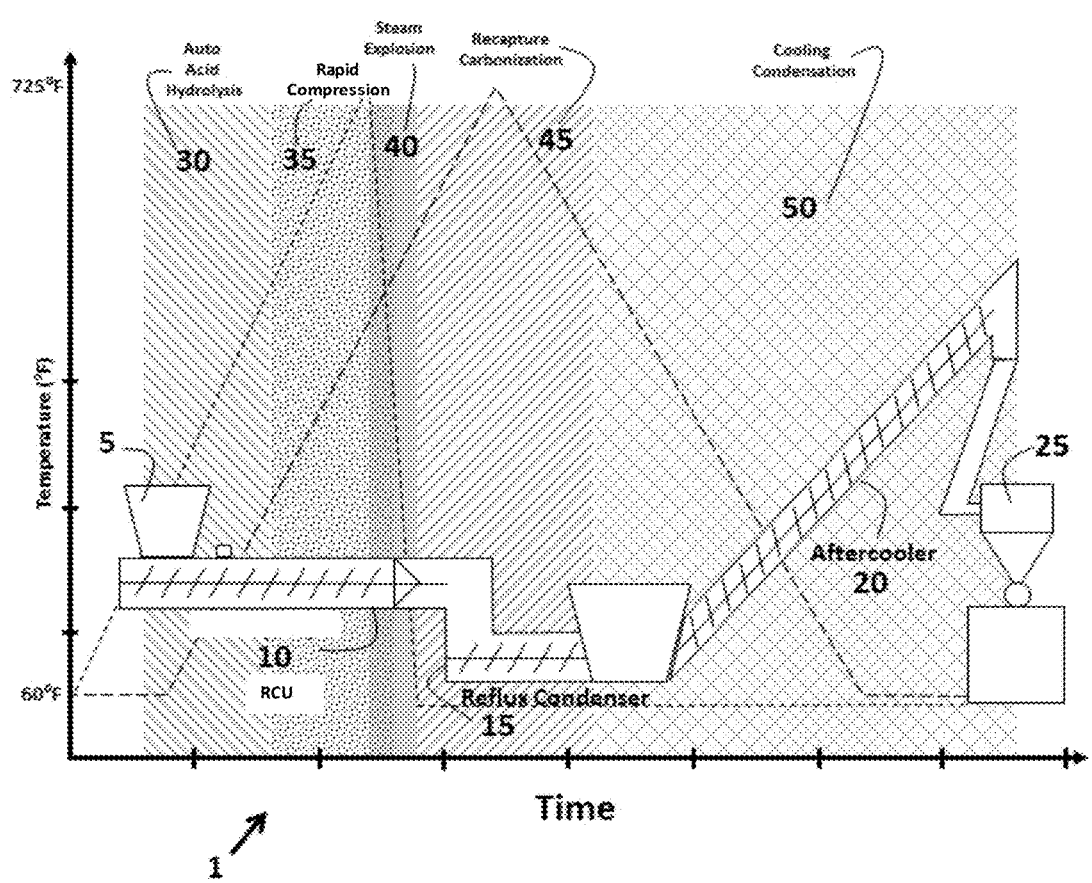
FIG. 1 is a schematic representation of a rotary biomass rapid compression unit (RCU) system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure addresses the treatment of moisture-containing or water laden materials by providing an apparatus and method that adapts a rapid compression unit (RCU) for drying or gasification or bio-char/bio-coal formation to enhance efficiency and to reduce the occurrence of plugging during operation. Plugging may be defined as the formation of a dense mass that obstructs a passageway in a barrel of a dryer or gasification system. The occurrence of plugging causes an undesirable increase of pressure within the barrel. One skilled in the art will understand that the apparatus and method of the present disclosure is described throughout the present disclosure in conjunction with a rotary biomass RCU that can be used for treating with heat produced through friction and compression to form biomass materials in order to more fully illustrate the apparatus and method. The incorporation and use of such an apparatus in other types of systems to dry or form other materials is contemplated to be within the scope of the present disclosure. The material being formed may be, without limitation, a cellulosic material, a biomass material such as bio-oil, bio-char and bio-coal and other bi-product thereof.

Biomass materials are generally a mixture of three basic cellulosic materials, namely, cellulose, hemicellulose and lignin along with interstitial bound and unbound water. A rotary biomass dryer functions as a compression dryer or steam dryer as it uses the heat of compression as the Second Law of Thermodynamics is deployed to produce steam by compression and friction thereby effectively drying the wet biomass material. In an example, the treatment of biomass materials can fall into three broad categories or ranges, namely, mere drying or dehydration/rectification which can be referred to as non-destructive drying, an intermediate treatment step which includes at least partial destruction, which can be referred to as torrification and carbonization, and destructive drying which encompasses the complete carbonization of cellulosic material. Mere drying, which can mean operating temperature of up to about 250° C. means the removal of unbound water which can create steam. Mere dehydration occurs typically between 200° C. and 235° C. Rectification can occur between 235° C. and 250° C. which includes the removal of bound water as well. The rotary screw typically can operate at a suitable RPM to achieve this desired temperature. In an example, the RPM for an example six-inch or twelve-inch diameter compression screw to achieve these temperatures can be between 600-800 RPM.

For an intermediate treatment range, the RCU typically functions in the semi-destructive range, between a temperature of about 250° C. and 400° C. Within this temperature range, both unbound waters and bound waters are released from the biomass materials as well as additional syngas. This also forms biochar characterized by having some carbonization and porosity. Typically, a torrification range is between 250° C. and 270° C. and above that is considered carbonization (270° C.-400° C.). In an example the rotary screw typically can operate at a suitable RPM to achieve this desired temperature. In an example, the RPM for an example six-inch or twelve-inch diameter compression screw to achieve these temperatures can be between 800-1200 RPM.

Treatment above 400° C. is considered destructive because it creates biochar that can be fully carbonized, thus removing all water from the material as well as reactive products from the destruction and carbonization of the starting cellulosic material. This can also be referred to as gasification. In an example the rotary screw typically can operate at a suitable RPM to achieve this desired gasification temperature. In an example, the RPM for an example six-inch or twelve-inch diameter compression screw to achieve these temperatures can be above 1200 RPM.

Referring to FIG. 1 a rotary biomass rapid compression system (1) is shown and generally includes a feeding mechanism (5), a rotary biomass rapid compression unit (RCU) apparatus (10), a reflux condenser (15), an aftercooler stage (20), and an exit mechanism (25). The system can further include an additional condenser shown in FIG. 3 that runs parallel with the reflux condenser depending on the intended purpose of system (1). Along the entire length of the system (1), the various portions of the system (1) may also be described to include various zones, namely, auto acid hydrolysis (30), rapid compression (35), steam explosion (40), recapture carbonization (45), and cooling condensation (50). Some of these zones may overlap with one another as shown in FIG. 1 with respect to the rapid compression zone (35) and the steam explosion zone (40). The biomass material may be subjected to any of these zones either individually or in any combination depending on the desired output. Further details associated with a rotary mass dryer system and a wood gasification system are described in U.S. Pat. Nos. 8,667,706 and 7,144,558, respectively, the entire contents of which are hereby incorporated by reference.

A rotary biomass RCU apparatus 10 may perform better with a uniform feed rate in order to achieve a relatively high efficiency. In other words, it is desirable that the apparatus maintains a uniform flow rate provided by feeding mechanism 5. Thus the rotary biomass RCU system (1) may include one or more feed improvements, namely, a crammer feeder, an in-feed mixer, a preheater, and/or a dual belt feeder to enhance the uniformity of the flow rate. The rotary biomass RCU system may also incorporate the use of a pretreatment, such as without limitation in-situ acid treatment, e.g., auto acid hydrolysis or inorganic sequestering. Further details associated with feed improvements and pretreatment can be found in co-pending U.S. patent application Ser. No. 15/066,894, filed Mar. 10, 2016, which claims priority to U.S. Provisional Patent Application No. 62/130,820 filed Mar. 10, 2015, the entire content of which is hereby incorporated by reference. In an example, a crammer feeder is used as described in the Ser. No. 15/066,894 application, which provides a uniform feed rate to reduce dust created by windage, which may result from the compression unit.

Figure 2:
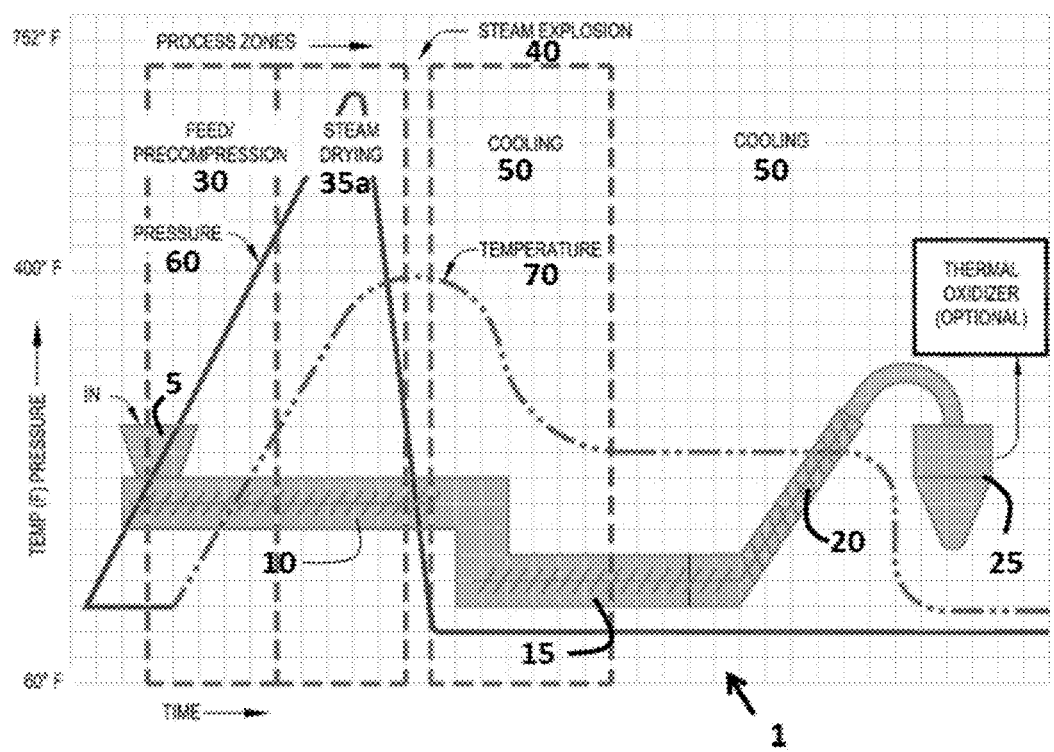
FIG. 2 is schematic representation of the rotary biomass RCU of FIG. 1 operated below an autoignition temperature.
Figure 3:
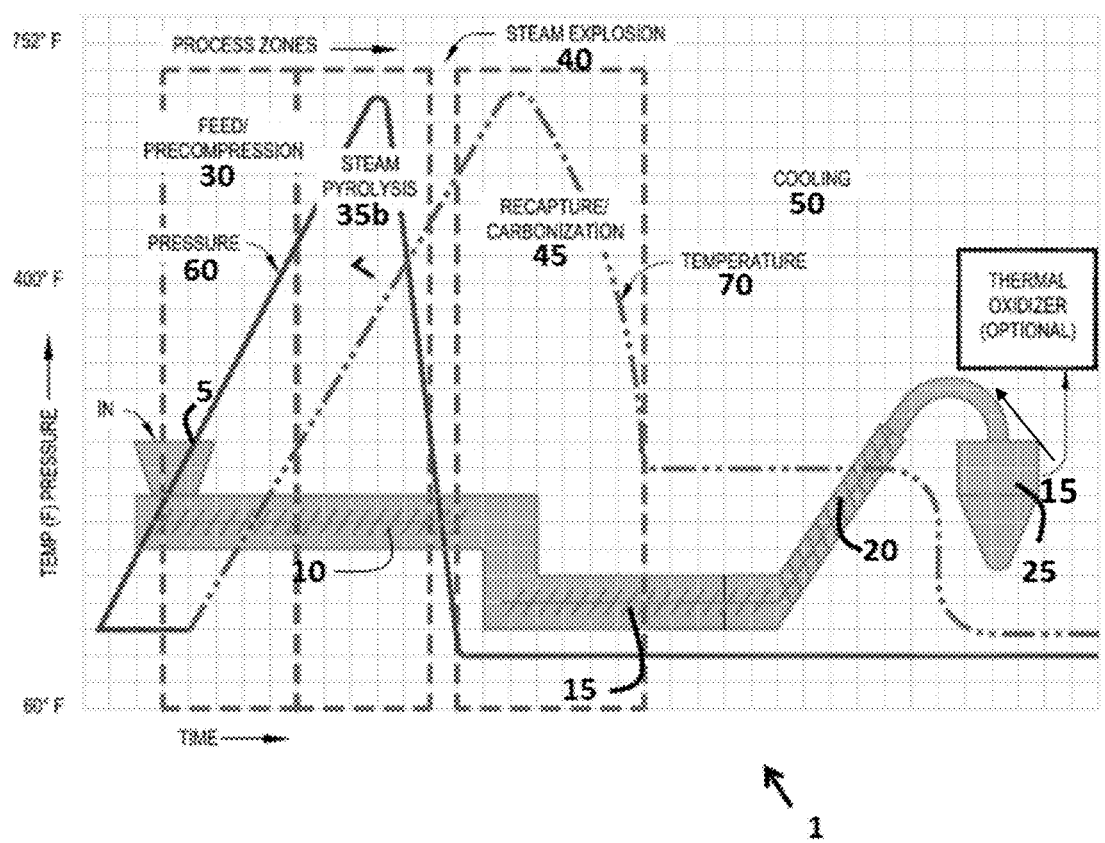
FIG. 3 is schematic representation of the rotary biomass RCU of FIG. 1 operated above an autoignition temperature.

Referring now to FIGS. 2 and 3, pressure (60) and temperature (70) that occurs in a biomass RCU system (1) increase during its operation as the biomass material moves from the feeding mechanism (5) through the RCU (10). In an example, the temperature (70) and pressure (60) increases through the pretreatment or precompression (e.g., auto acid hydrolysis) stage (30) and the rapid compression or steam drying or pyrolysis stage (35). The pressure reaches a peak during the rapid compression or steam drying/pyrolysis stage (35) and then rapidly decreases as the biomass moves through the steam explosion stage (40) or from the biomass dryer (10) into the reflux condenser (15). In the example of FIG. 3 (discussed below), syngas can be captured and condensed into bio-oil using a second condenser. A manifold apparatus can be useful in capturing the gas and feeding it into the second condenser. In the example of FIG. 3, a shell and tube condenser is used. When the temperature (70) does not reach the autoignition temperature limit, a recapture/carbonization stage does not occur, but rather the biomass material moves from steam drying (35a) directly into the cooling stage (50) as shown in FIG. 2. However, when the temperature (70) does reach the autoignition temperature limit, a recapture/carbonization stage (45) occurs following the steam pyrolysis (35b) stage and the initiation of the cooling stage (50) is delayed as shown in FIG. 3.

Figure 4:
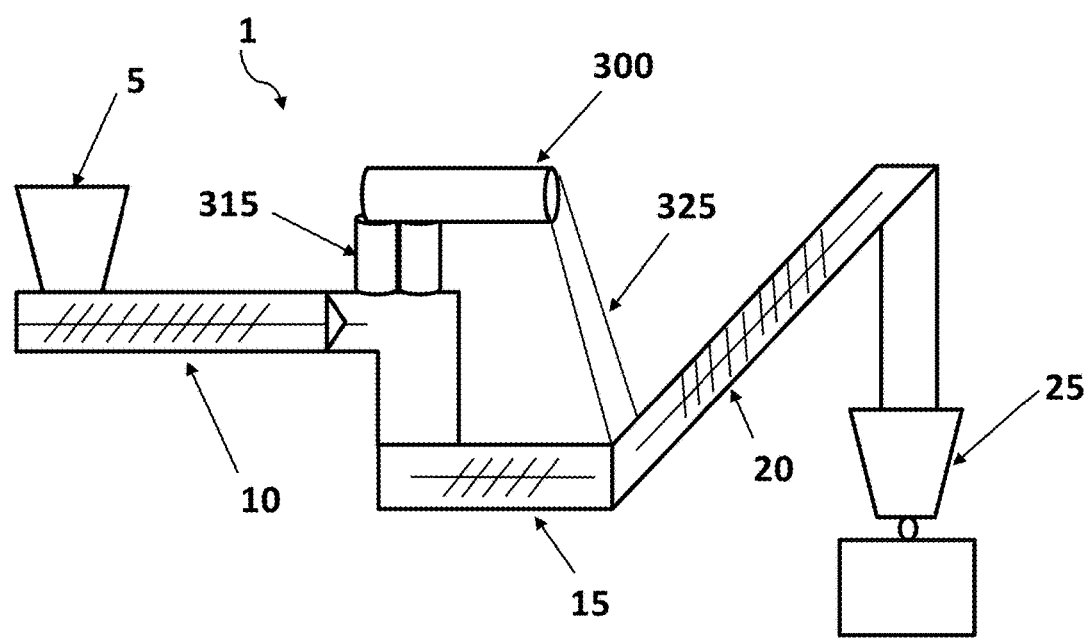
FIG. 4 is a schematic representation of a rotary biomass RCU system further including a second condenser coupled to the RCU and an aftercooler and constructed in accordance with the teachings of the present disclosure.

Referring to FIG. 4, an exemplary rapid compression system (1) is shown with a dual parallel condenser construction. This form is especially useful in forming bio-char, bio-oil, and bio-coal, depending on the desired result, particularly for the intermediate treatment scenario described hereinabove. In this example, a rotary biomass RCU system (1) is shown and generally includes a feeding mechanism (5), a rotary biomass RCU (10), a reflux condenser (15), a second condenser (300), a manifold apparatus (315), an aftercooler stage (20), and an exit mechanism (25). The second condenser (300) can run parallel with the reflux condenser (15) depending on the intended purpose of system (1).

In an example, under certain operation conditions, such as during an intermediate treatment, syngas is produced through the RCU unit (10) which can be captured in a gas manifold apparatus (315). Partial condensation can occur of the gasses in manifold apparatus (315) which is then fed into the second condenser (300). Condenser (300) can be a shell and tube condenser as described in more detail below related to FIGS. 7A and 7B. Condenser (300) can produce a liquid condensate (325) which can be referred to as bio-oil. The resulting condensate (325) produced in condenser (300) can be used in a variety of ways. Bio-oil can be separated on its own from remaining gasses and be used for a variety of purposes. Alternatively, the bio-oil or condensate (325) product can be recombined with the resultant bio-product (i.e., bio-char or bio-coal) produced in the reflux condenser (15). The bio-oil (325) from condenser 300 can be sprayed over or fed to the bio-product leaving condenser (15) and it can be recombined at any point throughout aftercooler (20). Combining the bio-oil from the second condenser (315) with the bio-product from the reflux condenser (15) can produce a bio-coal.

Bio-char is defined as a bio-product material that has some carbonization along with a given porosity. The bio-oil that can be formed through condensation in both the reflux condenser and the second condenser can be condensed back into the bio-char and thus forms a bio-coal. A bio-coal has a significantly reduced porosity but has a much higher BTU content and thus can provide a desirable fuel bio-product.

Figure 5:
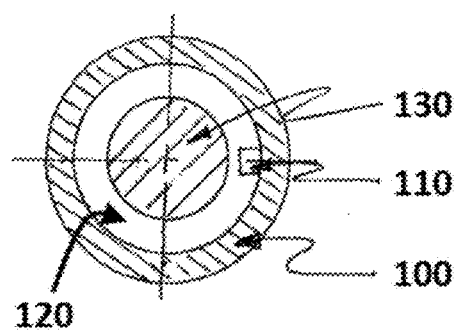
FIG. 5 is a cross-sectional view of a screw and barrel assembly for the rotary biomass RCU of FIGS. 1-4.
Figure 6:
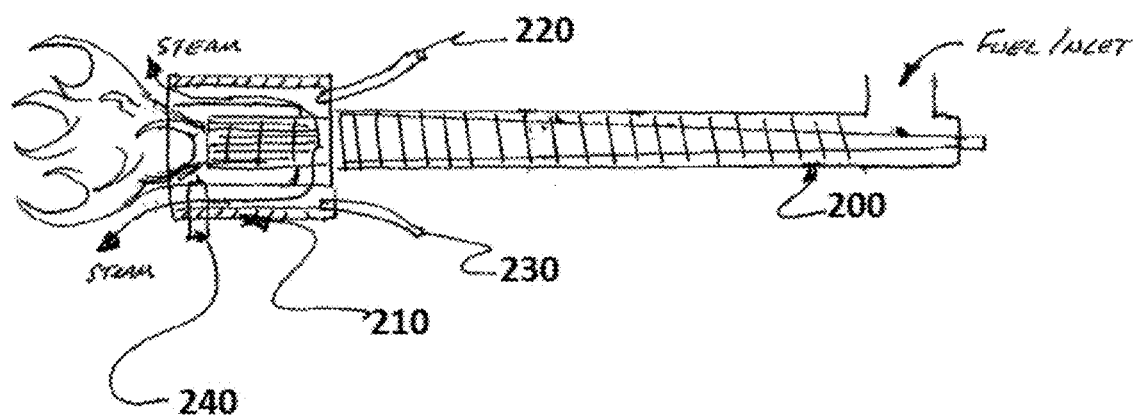
FIG. 6 is a schematic representation of a nozzle to enhance efficiency for a gasification apparatus in accordance with another form of the present disclosure.

Referring now to FIG. 5, an exemplary cross-sectional view of a screw (130) and barrel (100) assembly as part of the RCU (10) is shown. Barrel (100) can be an elongated housing for supporting and allowing screw (130), which in one form is tapered as shown in FIG. 6, to create compression along and through a longitudinal axis defined by barrel (100). In order to reduce the occurrence of plugging in the barrel (100) of the RCU apparatus, one or more flow disrupters (110) can be installed in the form of a shaped metal component located on the inside of the barrel (100). The flow disrupters (110) project into the passageway (120) formed between the screw (130) and barrel (100) through which the biomass material flows. In one form, the flow disrupters (110) are designed so that they do not make contact with the screw (130).

The shape of the flow disrupters (110) may individually be selected as defining any geometric shape, including but not limited to square, rectangular, triangular, or trapezoidal shape, among others. Since the metal component is three-dimensional (3-D) by nature, the overall shape of each flow disrupter (110) may include a singular shape or a mixture of shapes. For example, a metal component with all sides being square may be represented as a cube.

The flow disrupters (110) serve at least two purposes: 1) to assist in converting the rotary motion of the biomass as it is compressed to linear direction; and 2) mixing the biomass such that the biomass flows over onto itself, thereby, allowing for the occurrence of more uniform drying. A single flow disrupter (110) may be utilized or when desirable a plurality of flow disrupters (110) can be used. In an example, the plurality of flow disrupters (110) can be spaced either radially and optionally, uniformly, about the inner diameter of the barrel 100 and/or continuously spaced throughout the barrel (100). The use of the flow disrupters is found to improve overall throughput and enhance quality of the biomass material through the rotary biomass dryer system.

According to another aspect of the present disclosure, the adjustable nozzle on a conventional rotary biomass dryer, which is cumbersome and prone to wear, as well as difficult to accurately adjust can be replaced by providing a means to actually adjust the barrel relative to the screw. Adjusting the barrel in relation to the screw using precision controls and simple hydraulic currents has been found to accomplish the same function as the adjustable nozzle used in conventional dryers.

Referring now to FIG. 6, an exemplary dryer or gasification unit (200) is shown. The efficiency of unit (200) can be enhanced when it includes a nozzle (210) designed such that it allows for direct heating, drying, or steam production in conjunction with one or more adjustable air/oxygen inlet ports (220). Optionally, the nozzle (210) may include one or more supplemental gas inlet ports (230) or ignitors (240). Optionally, the addition of a particle filter and/or a condenser (such as a shell and tube), or the like, can be used to allow unit (200) to produce bio-oils.

Referring to FIGS. 7A and 7B, an example second condenser (300) from FIG. 3 is provided. Condenser (300) can be a shell and tube condenser. Condenser (300) can include an outer shell (302) formed around tubes that extend from inlet (301) that vents through vent (303). Gasses, such as syngas that can be released through the condenser can include but are not limited to carbon monoxide, carbon dioxide, and hydrogen. Coolant can be provided through coolant inlet (306) and exiting through coolant outlet (307). The particle trap (305) can include a cap (308). A drain (304) is provided to collect liquid condensate. The liquid condensate (325) from FIG. 4, can be bio-oil and collected separately or combined with the bio-product from the reflux condenser (15).

In an example, reflux condenser (15) can receive porous biochar from the compression unit such that a formed char passes through an exothermal condition that devolatilizes the char allowing for a cooling down phase to occur and to receive the gasses through a cooling auger. The reflux condenser can also receive vapors from the compression unit and condense it to a condensate. Gasses that flow into the reflux condenser can be referred to as bio-oil and can be condensed into the particles of the bio-char thus forming a bio-coal. In a further example, the condensate from the second condenser can be sprayed on the bio-product or processed into bio-products of the reflux condenser.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for treatment of a moisture-containing or water-laden material, the system comprising:
    a rapid compression unit (RCU) apparatus having a compression screw, a barrel, and one or more flow disrupters mounted on an interior surface of the barrel positioned in a passageway formed between the screw and the interior surface of the barrel, the screw operable for rotating at a speed to produce friction and compression to generate a desired raised temperature within the barrel; and
    a feeding mechanism for feeding a moisture-containing material to the RCU apparatus;
    wherein the RCU is adapted to receive, heat, and mix the moisture containing material along a longitudinal axis defined by the barrel and the screw and output a heat treated bio-product and exhaust gas.

2. The system according to claim 1, further comprising a reflux condenser for receiving the bio-product from the RCU apparatus, and a second condenser for receiving and condensing volatile gasses resulting from the treatment in the RCU apparatus, wherein a resultant condensate from the reflux condenser is either combined with a condensate from the second condenser or directly fed to an aftercooler for additional cooling to form a treated bio-product which is then fed to an exit mechanism.

3. The system according to claim 2, wherein the second condenser is a shell and tube condenser and is adapted to (i) receive syngas from the RCU apparatus, and (ii) condense the syngas to produce bio-oil.

4. The system according to claim 2, further comprising a manifold apparatus operatively connected to the RCU to direct gasses to the second condenser.

5. The system according to claim 1, wherein the one or more flow disrupters are operable to cause the moisture or water-laden material to fold over onto itself, thereby providing more uniform heat treatment.

6. The system according to claim 1, wherein the one or more flow disrupters is a metal component that is individually selected to define a geometric shape selected from the group consisting of a square, rectangular, triangular, trapezoidal shape, and combinations thereof.

7. The system according to claim 1, wherein the one or more flow disrupters comprises a plurality of flow disrupters and the flow disrupters are spaced apart either radially about the inner diameter of the barrel or continuously spaced throughout the barrel.

8. The system according to claim 1, further comprising a control system for adjusting the barrel relative to the screw.

9. The system according to claim 1, further comprising a nozzle connected to the RCU apparatus in conjunction with one or more adjustable air/oxygen inlet ports to perform any one of direct heating, drying, steam production and combinations thereof.

10. The system according to claim 8, further comprising at least one or more of a supplemental gas inlet port, an ignitor, and combination thereof coupled to the nozzle.

11. An apparatus for treatment of a moisture-containing or water-laden material, the apparatus comprising:
    an elongated barrel of fixed volume extending along a longitudinal axis, the barrel having a feeding section for receiving moisture-containing material from a feeder;
    a compression screw positioned within the barrel extending along the length of the barrel along the longitudinal axis; and
    at least one flow disrupter located on an inner surface of the barrel and projecting into a passageway formed by the screw and the barrel;
    wherein the barrel is adapted to receive, heat, and mix the moisture-containing material along the longitudinal axis defined by the barrel and the screw and output a heat treated bio-product and exhaust gas.

12. The apparatus according to claim 11, wherein the at least one flow disrupter is a metal component that defines a geometric shape selected from the group consisting of a square, rectangular, triangular, trapezoidal, polygonal shape, and combinations thereof.

13. A method of treating a moisture-containing or water-laden material to produce a bio-product, the method comprising the steps of:
    providing a moisture-containing or water-laden material;
    providing a rapid compression unit (RCU) system including:
        an RCU apparatus having a compression screw, a barrel, and one or more flow disrupters mounted on an interior surface of the barrel positioned in a passageway formed between the screw and the interior surface of the barrel, the screw operable to rotate at a speed to produce friction and compression to generate a desired elevated temperature within the barrel; and a feeding mechanism adapted to receive the material and feed the material to the RCU apparatus, feeding the moisture-containing or water-laden material to the RCU system using the feeding mechanism;

mixing and heating the moisture-containing or water laden material in the RCU apparatus such that the moisture-containing or water laden material separates into at least steam and a bio-product material; and removing the bio-product material from the RCU apparatus.

14. The method according to claim 13, wherein the one or more flow disrupters cause the water-laden material to fold over onto itself, thereby, providing more uniform heat treatment.

15. The method according claim 13, wherein the RCU apparatus subjects the moisture-containing or water-laden material to a temperature at or above its autoignition temperature, thereby subjecting the water-laden material to the steps of steam pyrolysis then rapid compression, steam explosion, and recapture/carbonization.

16. The method according to claim 13, wherein the RCU apparatus subjects the moisture-containing or water-laden material to a temperature that is below its autoignition temperature, thereby subjecting the water-laden material to the steps of steam drying, steam explosion, and cooling.

17. The method according to claim 13, wherein the one or more flow disrupters includes a plurality of flow disrupters and the flow disrupters are spaced apart either radially about the inner diameter of the barrel or continuously spaced throughout the barrel.

18. The method according to claim 13, wherein the method further comprises using a nozzle connected to the RCU apparatus in conjunction with one or more adjustable air/oxygen inlet ports to perform any one of direct heating, drying, steam production and combinations thereof.

19. The method according to claim 13, further comprising the steps of providing a reflux condenser and receiving the bio-product from the RCU apparatus, and a second condenser for receiving and condensing any volatile gasses to form a condensate resulting from the treatment in the RCU apparatus, wherein a resultant condensate from the reflux condenser is either combined with the condensate from the second condenser or directly fed to an aftercooler for additional cooling to form a treated bio-product which is then fed to an exit mechanism.

20. The method according to claim 13, wherein the second condenser is a shell and tube condenser and receives syngas from the RCU apparatus which is condensed to produce bio-oil.

* * * * *